United States Patent [19]

Jabs et al.

[11] Patent Number: 4,847,152
[45] Date of Patent: Jul. 11, 1989

[54] MICROCAPSULES WITH IMPROVED POLYUREA WALLS

[75] Inventors: Gert Jabs, Odenthal; Ulrich Nehen, Leverkusen; Hans J. Scholl, Köln, all of Fed. Rep. of Germany

[73] Assignee: Bayer Aktiengesellschaft, Leverkusen, Fed. Rep. of Germany

[21] Appl. No.: 105,796

[22] Filed: Oct. 7, 1987

[30] Foreign Application Priority Data

Oct. 22, 1986 [DE] Fed. Rep. of Germany ....... 3635821

[51] Int. Cl.⁴ .......................... B01J 13/02; B41M 5/22
[52] U.S. Cl. ................................ 428/402.21; 503/215; 264/4.3
[58] Field of Search ..................... 428/402.21; 503/215

[56] References Cited

U.S. PATENT DOCUMENTS

| | | | |
|---|---|---|---|
| 3,577,515 | 5/1971 | Vandegaer | 264/4.7 |
| 3,900,669 | 8/1975 | Kiritani | 428/402.21 X |
| 4,360,376 | 4/1981 | Koestler | 71/121 |
| 4,428,978 | 1/1984 | Jabs et al. | 264/4.7 |
| 4,465,755 | 8/1984 | Kiritani et al. | 428/402.21 |
| 4,497,793 | 2/1985 | Simkin | 264/4.7 |
| 4,592,957 | 6/1986 | Dahm et al. | 428/402.24 |
| 4,599,271 | 7/1986 | Chao | 264/4.7 |
| 4,668,580 | 5/1987 | Dahm et al. | 264/4.7 |
| 4,729,792 | 3/1988 | Seitz | 503/215 X |
| 4,761,255 | 8/1988 | Dahm et al. | 264/4.7 |
| 4,778,781 | 10/1988 | Washizu et al. | 503/215 |

OTHER PUBLICATIONS

Chemical Abstracts, p. 56, vol. 80, 1974.

Primary Examiner—John F. Terapane
Assistant Examiner—John M. Couert
Attorney, Agent, or Firm—Sprung, Horn, Kramer & Woods

[57] ABSTRACT

Improved microcapsules contain at least one wall which is the reaction product of at least one isocyanate-reactive group and an aromatic isocyanate which has the formula:

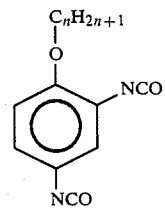

in which $n=8$ to 20. The microcapsules are useful in carbonless copy paper.

5 Claims, No Drawings

MICROCAPSULES WITH IMPROVED POLYUREA WALLS

Processes for the preparation of microcapsules by interface polyaddition between polyisocyanates and polyamines are known and are described, for example, in German Offenlegungsschriften (German Published Specifications) Nos. 1,109,335; 2,251,381; 2,242,910; 2,120,921; 2,311,712 and 2,523,586.

Isocyanates which are soluble as well as those which give an emulsion with the organic liquid can be used in this way in the dispersed phase.

However, the processes described hitherto still have some disadvantages:

To estalish the particle size, dispersing and emulsifying auxiliaries are added to the aqueous phase before the emulsion is prepared. The choice of suitable surface-active compounds for interface polyaddition is extremely limited, however, since the emulsifier molecules precisely cover the interface. This frequently leads to interference in the interface reaction. In particular, capsule walls which are diffusion-proof to the core material can as a rule be achieved only without the addition of an emulsifying auxiliary. However, if an emulsifying auxiliary is dispensed with, considerably higher shearing forces must be applied during emulsification.

Another disadvantage is the low solubility in the organic phase of the isocyanates used hitherto. In particular, in the preparation of microcapsules for production of carbonless copying systems, it would be desirable to increase the content of diluents, such as isoparaffins, and to use alkylbenzenes and therefore also to establish with microcapsules from interface reactions the state of the art already achieved with the other types of gelatine or malamine-formaldehyde capsules.

Although process variants with which isocyanates which are not soluble in the core material can be used under certain conditions are disclosed in German Patent No. A-3,421,865, discontinuous preparation of the microcapsules is not possible, however, by this method.

The invention was based on the object of the providing improved microcapsules. The invention relates to microcapsules containing at least one core material and at least one wall consisting essentially of the reaction product of at least one isocyanate with at least one isocyanate-reactive compound with an active H atom. According to the invention, the isocyanate is an aromatic isocyanate which has at least two isocyanate groups and which additionally contains an alkyl or alkoxy group with at least 6 C atoms.

In a preferred embodiment, the isocyanate corresponds to the following formula (I)

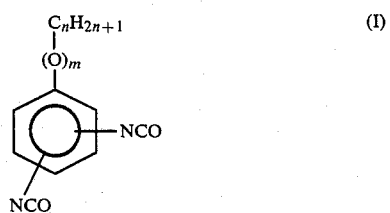

wherein
n denotes 6 to 20 and
m denotes 0 or 1, and wherein the aromatic ring can be unsubstituted or substituted by substituents customary in isocyanate chemistry.

In particularly preferred embodiments, the isocyanate corresponds to one of the following formulae (II) and (III)

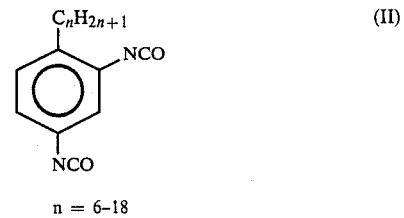

n = 6–18

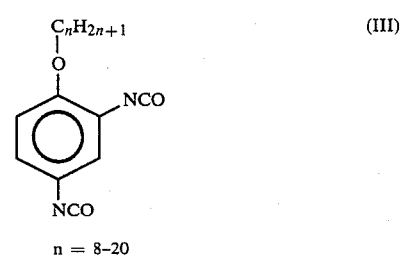

n = 8–20

The invention furthermore also relates to carbonless copying paper containing the microcapsules according to the invention.

The preparation of the alkylbenzene diisocyanates to be used according to the invention is described, for example, in German Patent No. A-3,105,776 and European Patent No. A-58,368. The alkoxybenzene diisocyanates can be prepared, for example, by the process described in German Patent Application No. 3,521,126.

The isocyanates can also be used in partly modified form, that is to say, for example, in the form of their biuret, isocyanurate or uretdione oligomers or as prepolymers.

Particularly suitable isocyanate-reactive compounds with an active H atom are:

1. Amines, preferably aliphatic, primary or secondary di- and polyamines, for example: ethylene-1,2-diamine, bis(3-aminopropyl)amine, hydrazine-2-ethanol, bis(2-methylaminoethyl)methylamine, 1,4-diaminocyclohexane, 3-amino-1-methyl-aminopropane, N-hydroxyethylethylenediamine, N-methyl-bis(3-aminopropyl)amine, 1,4-diamino-n-butane, 1,6-diamino-n-hexane, ethylene-1,2-diamine-N-ethyl-sulphonic acid (as an alkali metal salt), 1-aminoethylene-1,2-diamine and bis(N,N'-aminoethyl)ethylene-1,2-diamine.

Hydrazine and its salts are claimed in the same way as an amine in the present connection. Preferred amines (crosslinking agents) in the context of the invention are diethylkenetriamine, hexamethylenediamine, hydrazine hydrate, 4,4'-diphenylmethanediamine, triethanolamine and/or mixtures thereof.

Amines which are at least trifunctional and have at least 3 primary amine groups can preferably be used. 1,6,11-Triaminoundecane may be mentioned as an example of these compounds.

These amines can be obtained by condensation of cyclic lactams and subsequent aminolysis and hydrogenation, see also Angew. Chemie 72 [1960], page 1002.

2. Alcohols, in particular polyethers which contain OH groups and amino groups (polyether-polyols). The amino groups are preferably groups with a tertiary nitrogen.

In another preferred embodiment, the molecular weight of the polyether-polyol is 100 to 3,000 preferably 300 to 1,500.

In a further preferred embodiment, the polyether-polyol is the reaction product of an epoxide with nitrogen and/or a diamine and/or an alkanolamine, in particular ethanolamine, ethylene oxide and propylene oxide being particularly preferred epoxides.

3. It is furthermore possible to use PU catalysts instead of the crosslinking agents. In this case, polycondensation induced by reaction of the isocyanate with water takes place.

In addition to the isocyanates to be used according to the invention, other isocyanates can be used. In such mixtures, preferably at least 10% by weight, in particular at least 30% by weight, of the total amount of isocyanates consists of the isocyanates to be used according to the invention. Examples of preferred additional isocyanates are aliphatic, cycloaliphatic, araliphatic, aromatic and heterocyclic polyisocyanates, such as are described, for example, by W. Siefken in Justus Liebigs Annalen der Chemie, 562, pages 75–136, for example ethylene diisocyanate, tetramethylene 1,4-diisocyanate, hexamethylene 1,6-diisocyanate, dodecane 1,12-diisocyanate, cyclobutane 1,3-diisocyanate, cyclohexane 1,3- and 1,4-diisocyanate and any desired mixtures of these isomers, 1-isocyanato-3,3,5-trimethyl-5-isocyanatomethyl-cyclohexane (DAS (German Published Specification) 1,202,785 and U.S. Pat. No. 3,401,190), hexahydrotoluylene 2,4- and 2,6-diisocyanate and any desired mixtures of these isomers, hexahydrophenylene 1,3- and/or 1,4-diisocyanate, perhydrodiphenylmethane 2,4'- and/or 4,4'-diisocyanate, phenylene 1,3- and 1,4-diisocyanate, toluylene 2,4- and 2,6-diisocyanate and any desired mixtures of these isomers, diphenylmethane 2,4'- and/or 4,4'-diisocyanate, naphthylene 1,5-diisocyanate, triphenylmethane 4,4',4"-triisocyanate, polyphenyl-polymethylene polyisocyanates, such as are obtained by aniline-formaldehyde condensation and subsequent phosgenation and are described, for example, in British Patent Spec. No. 874,430 and 848,671, m- and p-isocyanatophenyl-sulphonyl isocyanates according to U.S. Pat. No. 3,454,606, perchlorinated aryl polyisocyanates, such as are described, for example, in German Auslegeschrift (German Published Specification) No. 1,157,601 (U.S. Pat. No. 3,277,138), polyisocyanates containing carbodiimide groups, such as are described in German Patent Specification 1,092,007 (U.S. Pat. No. 3,152,162), diisocyanates such as are described in U.S. Pat. No. 3,492,330, polyisocyanates containing allophanate groups, such as are described, for example, in British Patent Specification No. 761,626 and in Published Dutch Patent Application No. 7,102,524. Polyisocyanates containing isocyanurate groups, such as are described, for example, in U.S. No. 3,001,973, in German Patent Specification Nos. 1,022,789, 1,222,067 and 1,027,394 and in German Offenlegungsschriften (German Publisehd Specifications) No. 1,929,034 and 2,004,048, polyisocyanates containing urethane groups, such as are described, for example, in Belgian Patent Specification No. 752,261 or in U.S. Pat. No. 3,394,164, polyisocyanates containing acylated urea groups in accordance with German Patent Specification No. 1,230,778, polyisocyanates containing biuret groups, such as are described, for example, in German Patent Specification No. 1,101,394 (U.S. Pat. Spec. Nos. 3,124,605 and 3,202,372) and in British Patent No. 889,050, polyisocyanates prepared by telomerization reactions, such as are described, for example, in U.S. Pat. No. 3,654,106, polyisocyanates containing ether groups, such as are described, for example, in British Patent Specifications Nos. 965,474 and 1,072,956, in U.S. Pat. Spec. No. 3,567,763 and in German Pat. No. 1,231,688, reaction products of the abovementioned isocyanates with acetals in accordance with German Patent Specification No. 1,072,385, and polyisocyanates containing polymeric fatty acid radicals in accordance with U.S. Pat. No. 3,455,883.

It is also possible for the distillation residues which contain isocyanate groups and are obtained in the industrial preparation of isocyanates to be used, if appropriate as a solution in one or more of the abovementioned polyisocyanates. It is furthermore possible to use any desired mixtures of the abovementioned polyisocyanates.

Suitable modified aliphatic isocyanates are those based on hexamethylene 1,6-diisocyanate, m-xylylene diisocyanate, 4,4'-diisocyanato-dicyclohexylmethane or isophorone diisocyanate, which contain at least two functional isocyanate groups per molecule.

Polyisocyanates based on derivatives of hexamethylene 1,6-diisocyanate with a biuret structure in accordance with DE-AS (German Published Specification) No. 1,101,394, DE-AS (German Published Specification) No. 1,543,178, DE-OS (German Published Specification) No. 1,568,017 and DE-OS (German Published Specification) No. 1,931,055 are also suitable.

Polyisocyanato-polyuretonimines such as are formed by carbodiimidation of hexamethylene 1,6-diisocyanate containing biuret groups with organophosphorus catalysts by further reaction of the carbodiimide groups primarily formed with isocyanate groups to give uretonimine groups, can also be used.

It is also possible to use isocyanurate-modified polyisocyanates with more than two terminal isocyanate groups. The preparation of isocyanurate-modified polyisocyanates based on hexamethylene diisocyanate is described specifically in DE-OS (German Published Specification) No. 2,839,133. The others can be obtained analogously.

The isocyanates of the formula (IV)

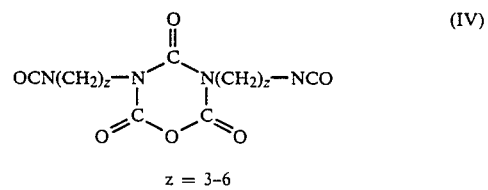

$z = 3-6$ are furthermore suitable.

It is also possible to use mixtures of the modified aliphatic isocyanates mentioned and the aromatic isocyanates mentioned, in particular diphenylmethane disocyanates, which can optionally be modified.

Preferred isocyanates are biuret-containing hexamethylene diisocyanate mixed with diphenylmethane-4,4'-diisocyanate, if appropriate with a 2,4-content, trimerized hexamethylene diisocyanate mixed with diphenylmethane 4,4'-diisocyanate, if appropriate with a 2,4-content, and/or isocyanates of the formula (IV) (oxadiazinetrione of hexamethylene and diisocyanate).

Suitable core materials for encapsulation with the isocyanates according to the invention are all hydrophobic liquids which have a low water-miscibility, for example aliphatic and aromatic hydrocarbons, halogenohydrocarbons, ethers, esters and the like containing no group which reacts with isocyanate.

The core materials can also contain dissolved solids, for example active compounds, pharmaceuticals, pesticides, herbicides and the like. Where the capsules are used for carbonless copying paper, the core material contains a dyestuff precursor, preferably in the form of a solution.

Examples of dyestuff precursors are triphenylmethane compounds, diphenylmethane compounds, xanthene compounds, thiazine compounds and spiropyran compounds.

Compounds which are particularly suitable are: triphenylmethane compounds: 3,3-bis-(p-dimethylaminophenyl)-6-dimethylaminophthalide ("crystal violet lactone", called "C.V.L." below) and 3,3-bis-(p-dimethylaminophenyl)-phthalide ("malachite green lactone"), diphenylmethane compounds: 4,4'-bis-dimethylaminobenzohydrylbenzyl ether, N-halogenophenylleucauramine, N-β-naphthylleucauramine, N-2,4,5-trichlorophenylleucauramine and N-2,4-dichlorophenylleucauramine; xanthene compounds: rhodamine-β-anilinolactam, rhodamine-β-(p-nitroanilino)-lactam, rhodamine-β-(p-chloroanilino)lactam, 7-dimethylamine-2-methoxy-fluoran, 7-diethylamino-3-methoxyfluoran, 7-diethylamino-3-methylfuoran, 7-diethylamino-3-cholorofluoran, 7-diethylamino-3-chloro-2-methylfluoran, 7-diethylamino-2,4-dimethylfluoran, 7-diethylamino-2,3-dimethylfluoran, 7-diethylamino-(3-acetylmethylamine)-fluoran, 7-diethyl-amino-3-methylfluoran, 3,7-diethylaminofluoran, 7-diethylamino-3-(dibenzylamine)-fluoran, 7-diethylamino-3-(methylbenzylamino)-fluoran, 7-diethylamino-3-(chloroethylmethylamino-fluoran, 7-diethylamino-3-(dichloroethylamine)fluoran and 7-diethylamino-3-(dethylamine)-fluoran; thiazine compounds: N-benzoylleucomethylene blue, o-chlorobenzoylleucomethylene blue and p-nitrobenzoylleucomethylene blue; and spiro compounds: 3-methyl-2,2'-spirobis-(benzo(f)-chromen).

Solvents which dissolve these dyestuff precursors are, for example, chlorinated diphenyl, chlorinated paraffines, cottonseed oil, ground nut oil, silicone oil, tricresyl phosphate and monochlorobenzene, and furthermore partly hydrogenated terphenyls, alkylated diphenyls, alkylated naphthalenes, aryl ethers, arylalkyl ethers, more highly alkylated benzene and others, and mixtures thereof.

Diluents, such as, for example, kerosene, n-paraffins and iso-paraffins, are frequently added to the solvents.

To prepare the microcapsules by the polyaddition process, the isocyanate is dissolved in a hydrophobic liquid of low water miscibility, for example in liquids of the above mentioned type and this organic phase is emulsified in the continuous aqueous phase, which contains protective colloids and if appropriate emulsifiers. An aqueous polyamine solution in a stoichiometric amount to the aromatic isocyanate in the organic phase is added to the emulsion.

To stabilize the emulsion formed, protective colloids are added to the aqueous phase. Examples of such products which act as protective colloids are carboxymethylcellulose, gelatine and polyvinyl alcohol.

The microcapsules can be prepared discontinuously. Dispersing apparatuses which generate a shear gradient are in general used. Examples of these are paddle, basket and high-speed stirrers, colloid mills, homogenizers, ultrasonic dispersers, nozzles, steel nozzles and Supraton ® machines. The degree of turbulence during mixing primarily determines the diameter of the microcapsules obtained. Capsules with a size from 1 to 2,000 μm can be prepared. Capsules with diameters of 2 to 20 μm are preferred.

After brief further aftertreatment, the highly concentrated suspensions can be used directly for the particular envisaged intended use.

The suspensions can be converted into agglomerate-free capsule powders, for example by spray-drying. Spray-dryng is particularly efficient for suspensions with such a degree of concentration, sine the amount of water to be evaporated is comparatively low.

The microcapsule dispersions containing dyestuff precursors can be used, for example, for the production of carbonless copying paper.

For this, the suspensions according to the invention are provided with binders and spacers and coated onto a paper carrier web. The formulation of such coating mixtures is prior art which has been known for a long time.

On the basis of the high capsule content, it is also possible for the suspensions according to the invention to be used directly, without expensive concentration, for the preparation of aqueous flexographic printing inks. The preparation of flexographic printing inks containing capsules and the preparation of completely or partly coated carbonless copying paper is already known. The advantage of using the suspensions according to the invention is that the concentrations previously necessary can be dispensed with.

Reaction partners which can be used for the dye-stuff precursors in the microcapsules are colour developers which are known per se, such as, for example, acid clays, montmorillonite, bentonites and smectites or synthetic phenolic resins.

The donor component on duplicating sets is in general the reverse side of the top sheet. The front side of the next sheet is coated with the colour developer component. This layer is called the receiver component. In duplicating sets, the receiver component is the upper side of the second sheet of paper. With multiple duplicating sets, the following donor sheets must carry a receiver coating on the opposite side. The preparation of such receiver coatings is known and is also desribed in German Offenlegungsschriften (German Published Specifications) No. 1,934,457 and 1,955,542.

Further details for carrying out the process according to the invention can be found in the following examples.

COMPARISON EXAMPLE 8.8 parts of a fluoran colour former (Pergascript Schwarz IBR form Ciba-Geigy AG) were dissolved in 167 parts of dodecylbenzene, with warming. 24 parts of biuretized hexamethylene diisocyanate were then added. The resulting mixture was cloudy and inhomogeneous and was therefore not a solution.

The resulting mixture (emulsion) was poured to 250 parts of a 0.5% strength aqueous solution of a polyvinyl acetate, to the extent of 90% hydrolysed, and an emulsion with a droplet size of 6 μm was prepared in a rotor/stator emulsifying apparatus.

5.1 parts of diethylenetriamine in 45 parts of water were then added.

The dispersion was treated at 60° C. for 3 hours and a 40% strength capsule dispersion was thus prepared.

When this capsule emulsion was applied to the developer side of commercially available CF paper (3 g/m² capsule application) and dried, a grey discoloration resulted spontaneously, this being a sign that capsule walls which were partly permeable to the colour former solution were formed.

Spherical microcapsules are to be clearly recognized under the microscope.

EXAMPLE 1

8.8 parts of a fluoran colour former (Pergascript Schwarz IBR from Ciba-Geigy AG) are dissolved in 167 parts of dodecylbenzene, with warming. 24 parts of dodecylbenzene diisocyanate were then added. The resulting solution is mixed with 250 parts of a 0.5% strength aqueous solution of a 90% hydrolyzed polyvinyl acetate and the mixture is emulsified to an emulsion with a droplet size of 6 μm in a rotor/stator emulsifying apparatus.

5.1 parts of diethylenetriamine in 45 parts of water were then added.

The 40% strength capsule dispersion formed was aftertreated at 60° C. for 3 hours.

When the dilute capsule dispersion was applied to the developer layer of CF paper (3 g/m² capsule application) and dried, no discoloration resulted. Only when pressure was applied did the capsules break and a discoloration was observed.

EXAMPLE 2

The procedure followed is as in Example 1, but with the difference that a mixture of 20 parts of biuretized hexamerthylene diisocyanate with an isocyanate content of 21% and 4 parts of dodecylbenzene diisocyanate were used instead of the pure dodecylbenzene diisocyanate.

When the capsule tightness was checked as in Example 1, discoloration of the paper likewise occurred only on application of (writing) pressure.

What is claimed is:

1. Microcapsules containing at least one core material and at least one wall consisting essentially of the reaction product of at least one isocyanate with at least one isocyanate-reactive compound with an active H atom, the isocyanate being of the formula

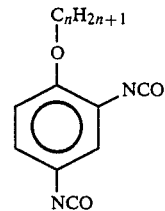

in which $n = 8$ to 20.

2. Microcapsules according to claim 1, in which the isocyanate-reactive compound with an active H atom is an amine.

3. Microcapsules according to claim 1, in which the isocyanate-reactive compound with an active H atom is an alcohol.

4. Microcapsules according to claim 1, in which the core material contains dyestuff precursor.

5. Carbonless copying paper containing microcapsules containing at least one core material and at least one wall consisting essentially of the reaction product of at least one isocyanate with at least one isocyanate-reactive compound with an active H atom, the isocyanate being of the formula

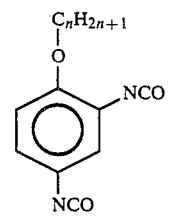

in which $n = 8$ to 20.

* * * * *